Patented May 26, 1953

2,640,038

UNITED STATES PATENT OFFICE 2,640,038

MAR-RESISTANT PAINT COMPOSITION

Edward A. Wilder and Francis E. Chapman, Racine, Wis., assignors to S. C. Johnson & Son, Inc., Racine, Wis.

No Drawing. Application January 28, 1950, Serial No. 141,162

16 Claims. (Cl. 260—22)

This invention relates to paint compositions, and particularly, to paint compositions having one or more film-forming resins and one or more of certain synthetic wax esters, the ester content being soluble in the resin content.

During recent years the beneficial results capable of being attained by the addition of natural and synthetic waxes to paint compositions have been well established. Such components are known to render a paint composition capable of imparting water, dirt and mar-resistance to the paint film.

Whereas natural waxes including animal, such as beeswax; vegetable wax, such as carnauba and ouricury; and mineral wax, especially the paraffines, have been or are presently employed as the wax components in various compositions and have successfully imparted desirable characteristics to the paint film; nevertheless, these constituents also transmit inherent, undesirable physical properties to the film. Even with the inclusion of efficacious drying agents, a paint having one of the above waxes as a component produces a film which requires a lengthy period to dry, remaining tacky and sticky to the touch for periods often exceeding 72 hours. Furthermore, such paints have lacked the lasting adhesive qualities demanded of a paint film. Various synthetic waxes or resins have been experimented with in an endeavor to minimize the above limitations, as, for example, that described in U. S. Patent 2,353,910; but even where formulation of such synthetic wax paints has been successful in partially eliminating these undesirable features, an additional preclusion exists.

Paint coatings having resinous components and employed as protective coatings have been complemented with synthetic waxes. Whereas common solvents have been disclosed for both the resinous and synthetic wax material, nevertheless, upon evaporation of the solvent the colloidally dispersed materials, being incompatible, tend to molecularly constrict, causing a "haze" or cloud to form in the film.

Now, in accordance with our invention, we have found that a synthetic wax, a specific type of ester, can be employed in such manner so as to be completely soluble in the complementary resin or resins of the composition, therefore resulting in the discovery of a mar-resistant paint composition consisting essentially of pigment and vehicle, said vehicle consisting essentially of an organic solvent, a resin and an ester of a polyhydric alcohol selected from the group consisting of pentaerythritol, polypentaerythritols, and mixtures thereof at least partially esterified with a saturated fatty acid having from 15 to 22 carbon atoms. The ester is soluble in the resin and is present in a quantity within a range from an amount sufficient to increase the contact angle of water with material treated with the composition at least 20° over that of material treated with a portion of the composition not containing the ester, the upper limit of the range being 4% by weight of the total composition.

Now, having indicated in a general way, the nature and purpose of this invention, the following examples will illustrate the invention. It is to be understood, however, that such examples are presented merely as illustrations of the invention, and are not to be construed as limiting the same.

Example 1

One and one-half lbs. of 60% non-volatile alkyd resin solution, 0.45 lb. of mineral spirits, two grams of soya lecithin, 0.05 lb. of aluminum stearate, 1.4 lbs. of titanium-calcium pigment and 1.2 lbs. of titanium dioxide were charged into a pebble mill and run in the mill for approximately 18 hours. After this period of time the mill was stopped, drained of the contents and washed with 0.2 lb. of mineral spirits. A paste resulted which totaled approximately five lbs. in weight.

A paint base was produced with 600 grams of the above paste incorporated by agitation with 75 grams of 60% non-volatile alkyd resin solution, 1.4 grams of 6% cobalt naphthenate drier, 3.25 grams of 24% lead naphthenate drier and 0.6 grams of soya lecithin. In another vessel six grams of mineral spirits were admixed with 0.8 gram of the ester of pentaerythritol monostearate by heating the mixture of wax and thinner to a temperature of 160° F. This mixture was added to 172 grams of the above paint base and thoroughly admixed therewith. This resulted in a paint composition having a wax concentration of 0.446% based upon the total weight of the composition. Glass slides were dipped in the paint and left exposed to the atmosphere to dry at room temperature. After approximately eight hours the slides were examined and it was noted that the paint film was thoroughly dry and no indication of ester-resin separation was evident, the film being entirely devoid of any molecular constriction, hazing or clouding.

Water contact angle tests were then conducted upon the slides and the film formed by the paint was found to present a contact angle of 99°.

*Example 2*

A paint base was prepared as disclosed in Example 1 and to 172 grams of this base was added 0.1 gram of tripentaerythritol hexastearate which had been previously mixed with 5.5 grams of mineral spirits. The ester therefore constituted 0.056% by weight of the total paint composition. Glass slides were dipped in the finished paint and after eight hours' exposure to room temperature were found to be thoroughly dry. Microscopic examination of the paint film revealed no molecular constriction or separation of the resin and ester components. These slides were then subjected to tests to determine the contact angle of water upon the paint film and it was found to be 97°.

*Example 3*

A paint, identical to that disclosed in Examples 1 and 2, was produced, except that no pentaerythritol or polypentaerythritol ester was incorporated therein. Glass slides were dipped in the finished paint product and were allowed to thoroughly dry at room temperature. Subsequently, these slides were tested for degree of contact angle and it was found that the film presented a contact angle of 72°.

It will be noted that the film formed from the paint produced in Example 1, which included pentaerythritol, presented a water contact angle 27° greater than that presented by the film of the paint of Example 3. The paint film of Example 2 indicated a contact angle 25° greater than that of the paint film of Example 3. No pentaerythritol or polypentaerythritol ester was included in the paint composition of Example 3.

It is necessary that the ester be included in the paint composition in a quantity sufficient to increase the contact angle of water with the material treated with the paint at least 20° greater than that treated with a portion of the composition excluding the ester. The greater contact angle is a convincing indication of marked improvement in desirable characteristics of the paint including water and water vapor repellency and mar-resistance. We have not been satisfied with the comparative improved qualities where the contact angle is increased less than 20° and have therefore established that number as a criterion to optimum paint film characteristics. The tests referred to in each of the examples were conducted according to the "Sessile Drop Method." This method involves the direct observation of the interfacial angle made by the liquid as it contacts a flat horizontal surface and is sometimes referred to by the more descriptive term "Drop Silhouette Method." Small droplets of water were applied to the paint surface to be tested by means of a hypodermic syringe with the needle point ground square. A medicine dropper with a very small tip may also be used for this purpose. An optical system for projecting an enlarged image of the small droplets resting on the surface is required. A 25-power microscope was used and a shadow outline of the drops studied. This profile, essentially a cross section at the greatest diameter of the drop, is immediately studied with a goniometer eye piece and a photomicrographic record is preserved. The contact angle may be measured from the photomicrograph or through the goniometer but in either case a tangent is laid along the edge of the arc seen at the point of contact of the liquid and the solid surface. The angle between this tangent and a projection of the surface upon which the droplet rests is the contact angle. In using the goniometer, a cross hair was brought into position on this tangent and the angle read immediately from the protractor scale of the device. Previous setting to zero angle in the plane of the surface is required.

Whenever the resulting contact angle is believed to approach the critical minimum of 20° improvement, the tests disclosed above may be employed to make the calculation. However, the experienced paint technician can most often determine with relative assuredness that the angle is sufficient merely by visually observing drops of water resting on the paint film. This is true since it has been found that most paint compositions containing the novel components herein disclosed increase the contact angle upwards of 30°. For example, in equal portions of the paint composition taught in the examples, the following were employed:

| Ester | Quantity in Percent by Weight of Total Composition |
| --- | --- |
| Dipentaerythritol Pentastearate | 2.84 |
| Dipentaerythritol Tristearate | 0.14 |
| Dipentaerythritol Tetrastearate | 0.38 |

In each case glass slides were dipped in the finished paint and when water droplets were subsequently placed thereon, it was immediately evident to the eye that the improvement in contact angle was sufficient.

Whereas the minimum content of the ester is set forth in the examples, as measured by the resulting contact angle of the produced paint, it should be appreciated that not more than 4% by weight of the composition be used. When this maximum of the preferred quantity range is exceeded, the resultant paint film may not possess the degree of hardness desired.

Alkyd resins were shown as the resinous material included in the vehicle described in the examples. These alkyd resins are derived from mixtures of polyhydric alcohols, dibasic acids and long chain unsaturated acids or alcoholized oils. The dibasic acid most extensively used is phthalic. However, maleic, succinic and others may be used. The final alkyd resin used in the paint should contain from 35 to 75% oil modification. Besides these alkyd resins others are operable. These include the natural varnish resins, such as rosin or rosin esters; phenolic resins, which are usually products derived from the reaction of formaldehyde with para-alkyl substituted phenols; formaldehyde and melamine formaldehyde resins, especially where the paint product is to be converted by the application of heat; polystyrene resins such as styrene-modified material which may be copolymerized with unsaturated alkyd resins and drying oils; and materials such as polymethacrylic, coumarone and sulfonamide resins, chlorinated rubber, Epon resin esters (epichlorohydren-bisphenol condensation resins), etc. As is well known, the hard resins are preferably plasticized with, for example, drying oils or the like.

It should be appreciated that the paint hereinbefore described is in no way intended to be limited as to its common component parts since all of the constituents are well-known in the art with the exception of the novel use of the pentaerythritol and polypentaerythritol esters and their critical quantity relationship with the weight of the composition. Likewise, the method of manufacture disclosed in the examples, apart from the inclosure of the pentaerythritol stearate, is not intended to be limiting since it will be readily appreciated that the resulting paint may be produced by several art-disclosed methods.

Example 1 is directed toward the use of a pentaerythritol ester, i. e., pentaerythritol monostearate, while in Example 2 a polypentaerythritol ester, i. e., tripentaerythritol hexastearate was disclosed. These esters were shown by way of illustration only. While stearic acid is typical of the saturated fatty acids having from 15 to 22 carbon atoms which are operable, the other fatty acids which are members of this series are likewise operable. These acids include pentadecanoic, heptadecanoic, palmitic, arachidic and behenic.

The pentaerythritol and polypentaerythritol esters may be either partially or fully esterified. That is one or more of the hydroxyl groups of these polyhydric alcohols may be esterified. Thus, pentaerythritol esters which have been prepared by reacting stearic acid with pentaerythritol include pentaerythritol monostearate, pentaerythritol distearate, pentaerythritol tristearate and pentaerythritol tetrastearate. Polypentaerythritol esters may be prepared by reacting, for example, stearic acid with dipentaerythritol, tripentaerythritol or higher polyhydric alcohols under conditions so that one or more hydroxyl groups are esterified. While this will lead to a variety of compounds, they all possess wax-like characteristics, are resin-soluble and operable in this invention within the critical prescribed range.

Pigment, common solvents such as the naphthas, xylol, terpenes, etc., and as above-stated, the resin, may be any of the materials which are well-known in the art as operable components.

It will thus be seen that by virtue of the invention, a novel paint composition is produced which contains a synthetic wax which is entirely soluble in the compromising resin. Upon subsequent application to a surface and the evaporation of the solvent, no molecular constriction results, but rather, a retention of the uniform dispersion of the synthetic wax ester and the resin. This unique reaction eliminates all the undesirable haze or clouding formerly evident in other synthetic wax paint films. Furthermore, the inherent physical properties of a true wax component are retained. These include water and water vapor repellency, mar-resistance, smoothness of finish, etc. This fact is best evidenced by the results of contact angle tests which herein appear as comparative to adequate tests conducted upon films not containing the unique ester-resin blend.

Other modes of applying the principles of the invention may be employed instead of those explained, changes being made as regards the composition or method herein disclosed, provided the step or steps set forth in any of the following claims or the equivalent of such step or steps be employed.

We claim:

1. A mar-resistant paint composition comprising pigment and vehicle, said vehicle consisting essentially of an organic solvent, a resin and an ester of a polyhydric alcohol selected from the group consisting of pentaerythritol, polypentaerythritol and mixtures thereof, at least partially esterified exclusively with a monocarboxylic saturated fatty acid having from 15 to 22 carbon atoms, said ester being soluble in said resin and forming a physical solution therewith and being present in a quantity within a range of from an amount sufficient to increase the contact angle of water with material treated with said composition 20° over that treated with a quantity of said composition not containing said ester, the upper limit of said range being 4% by weight of the total composition.

2. A mar-resistant paint composition comprising pigment and vehicle, said vehicle consisting essentially of an organic solvent, a resin and an ester of pentaerythritol at least partially esterified exclusively with a monocarboxylic saturated fatty acid having from 15 to 22 carbon atoms, said ester being soluble in said resin and forming a physical solution therewith and being present in a quantity within a range of from an amount sufficient to increase the contact angle of water with material treated with said composition 20° over that treated with a quantity of said composition not containing said ester, the upper limit of said range being 4% by weight of the total composition.

3. A mar-resistant paint composition comprising pigment and vehicle, said vehicle consisting essentially of an organic solvent, a resin and an ester of dipentaerythritol at least partialy esterified exclusively with a monocarboxylic saturated fatty acid having from 15 to 22 carbon atoms, said ester being soluble in said resin and forming a physical solution therewith and being present in a quantity within a range of from an amount sufficient to increase the contact angle of water with material treated with said composition 20° over that treated with a quantity of said composition not containing said ester, the upper limit of said range being 4% by weight of the total composition.

4. A mar-resistant paint composition comprising pigment and vehicle, said vehicle consisting essentially of an organic solvent, a resin and an ester of tripentaerythritol at least partially esterified exclusively with a monocarboxylic saturated fatty acid having from 15 to 22 carbon atoms, said ester being soluble in said resin and forming a physical solution therewith and being present in a quantity within a range of from an amount sufficient to increase the contact angle of water with material treated with said composition 20° over that treated with a quantity of said composition not containing said ester, the upper limit of said range being 4% by weight of total composition.

5. A mar-resistant paint composition comprising pigment and vehicle, said vehicle consisting essentially of an organic solvent, a resin and an ester of pentaerythritol at least partially esterified exclusively with stearic acid, said ester being soluble in said resin and forming a physical solution therewith and being present in a quantity within a range of from an amount sufficient to increase the contact angle of water with material treated with said composition 20° over that treated with a quantity of said composition not containing said ester, the upper limit of said range being 4% by weight of total composition.

6. A mar-resistant paint composition comprising pigment and vehicle, said vehicle consisting essentially of an organic solvent, a resin and an ester of dipentaerythritol at least partially esterified exclusively with stearic acid, said ester being soluble in said resin and forming a physical solution therewith and being present in a quantity within a range of from an amount sufficient to increase the contact angle of water with material treated with said composition 20° over that treated with a quantity of said composition not containing said ester, the upper limit of said range being 4% by weight of total composition.

7. A mar-resistant paint composition comprising pigment and vehicle, said vehicle consisting essentially of an organic solvent, a resin and an ester of tripentaerythritol at least partially esterified exclusively with stearic acid, said ester being soluble in said resin and forming a physical solution therewith and being present in a quantity within a range of from an amount sufficient to increase the contact angle of water with material treated with said composition 20° over that treated with a quantity of said composition not containing said ester, the upper limit of said range being 4% by weight of total composition.

8. A mar-resistant paint composition comprising pigment and vehicle, said vehicle consisting essentially of mineral spirits, a resin and an ester of pentaerythritol at least partially esterified exclusively with stearic acid, said ester being soluble in said resin and forming a physical solution therewith and being present in a quantity within a range of from an amount sufficient to increase the contact angle of water with material treated with said composition 20° over that treated with a quantity of said composition not containing said ester, the upper limit of said range being 4% by weight of total composition.

9. A mar-resistant paint composition comprising pigment and vehicle, said vehicle consisting essentially of mineral spirits, a resin and an ester of dipentaerythritol at least partially esterified exclusively with stearic acid, said ester being soluble in said resin and forming a physical solution therewith and being present in a quantity within a range of from an amount sufficient to increase the contact angle of water with material treated with said composition not containing said ester, the upper limit of said range being 4% by weight of total composition.

10. A mar-resistant paint composition comprising pigment and vehicle, said vehicle consisting essentially of mineral spirits, a resin and an ester of tripentaerythritol at least partially esterified exclusively with stearic acid, said ester being soluble in said resin and forming a physical solution therewith and being present in a quantity within a range of from an amount sufficient to increase the contact angle of water with material treated with said composition 20° over that treated with a quanttiy of said composition not containing said ester, the upper limit of said range being 4% by weight of total composition.

11. A mar-resistant paint composition comprising pigment and vehicle, said vehicle consisting essentially of mineral spirits, an alkyd resin and an ester of pentaerythritol at least partially esterified exclusively with stearic acid, said ester being soluble in said resin and forming a physical solution therewith and being present in a quantity within a range of from an amount sufficient to increase the contact angle of water with material treated with said composition 20° over that treated with a quantity of said composition not containing said ester, the upper limit of said range being 4% by weight of total composition.

12. A mar-resistant paint composition comprising pigment and vehicle, said vehicle consisting essentially of mineral spirits, an alkyd resin and an ester of dipentaerythritol at least partially esterified exclusively with stearic acid, said ester being soluble in said resin and forming a physical solution therewith and being present in a quantity within a range of from an amount sufficient to increase the contact angle of water with material treated with said composition 20° over that treated with a quantity of said composition not containing said ester, the upper limit of said range being 4% by weight of total composition.

13. A mar-resistant paint composition comprising pigment and vehicle, said vehicle consisting essentially of mineral spirits, an alkyd resin and an ester of tripentaerythritol at least partially esterified exclusively with stearic acid, said ester being soluble in said resin and forming a physical solution therewith and being present in a quantity within a range of from an amount sufficient to increase the contact angle of water with material treated with said composition 20° over that treated with a quantity of said composition not containing said ester, the upper limit of said range being 4% by weight of total composition.

14. A mar-resistant paint composition comprising pigment and vehicle, said vehicle consisting essentially of mineral spirits, an alkyd resin and pentaerythritol monostearate, said pentaerythritol being soluble in said resin and forming a physical solution therewith and being present in a quantity within a range of from an amount sufficient to increase the contact angle of water with material treated with said composition 20° over that treated with a quantity of said composition not containing said ester, the upper limit of said range being 4% by weight of total composition.

15. A mar-resistant paint composition comprising pigment and vehicle, said vehicle consisting essentially of mineral spirits, an alkyd resin and dipentaerythritol tristearate, said dipentaerythritol being soluble in said resin and forming a physical solution therewith and being present in a quantity within a range of from an amount sufficient to increase the contact angle of water with material treated with said composition 20° over that treated with a quantity of said composition not containing said ester, the upper limit of said range being 4% by weight of total composition.

16. A mar-resistant paint composition comprising pigment and vehicle, said vehicle consisting essentially of mineral spirits, an alkyd resin and tripentaerythritol hexastearate, said tripentaerythritol being soluble in said resin and forming a physical solution therewith and being present in a quantity within a range of from an amount sufficient to increase the contact angle of water with material treated with said composition 20° over that treated with a quantity of said composition not containing said ester, the upper limit of said range being 4% by weight of total composition.

EDWARD A. WILDER.
FRANCIS E. CHAPMAN.

References Cited in the file of this patent

UNITED STATES PATENTS

| Number | Name | Date |
|---|---|---|
| 2,344,793 | Tissari | Mar. 21, 1944 |
| 2,345,528 | Bradley | Mar. 28, 1944 |
| 2,427,255 | Burrell et al. | Sept. 9, 1947 |
| 2,558,025 | Wicks | June 26, 1951 |